(12) United States Patent
Dakka et al.

(10) Patent No.: US 9,378,417 B2
(45) Date of Patent: Jun. 28, 2016

(54) CONTRAST FOR RGB IMAGES IN A GIS APPLICATION

(71) Applicant: Rolta India Ltd, Mumbai (IN)

(72) Inventors: Ravi Sankar Dakka, Mumbai (IN);
Ravindra N Kondekar, Mumbai (IN);
Laxmidhar V Gaopande, Mumbai (IN);
Saroja Uppu, Mumbai (IN)

( * ) Notice: Subject to any disclaimer, the term of this patent is extended or adjusted under 35 U.S.C. 154(b) by 36 days.

(21) Appl. No.: 14/291,078

(22) Filed: May 30, 2014

(65) Prior Publication Data

US 2015/0347838 A1 Dec. 3, 2015

(51) Int. Cl.
*G06K 9/00* (2006.01)
*G06K 9/46* (2006.01)
*G06T 7/40* (2006.01)

(52) U.S. Cl.
CPC .......... *G06K 9/00476* (2013.01); *G06K 9/4642* (2013.01); *G06K 9/4652* (2013.01); *G06T 7/408* (2013.01)

(58) Field of Classification Search
None
See application file for complete search history.

(56) References Cited

U.S. PATENT DOCUMENTS

| | | | |
|---|---|---|---|
| 2004/0008160 A1* | 1/2004 | Etheridge et al. | 345/30 |
| 2006/0126959 A1* | 6/2006 | Padwick et al. | 382/254 |
| 2006/0257048 A1* | 11/2006 | Lin et al. | 382/276 |
| 2008/0109327 A1* | 5/2008 | Mayle et al. | 705/27 |
| 2008/0129732 A1* | 6/2008 | Johnson et al. | 345/424 |
| 2009/0110274 A1* | 4/2009 | Atanassov | G06T 5/009 382/169 |
| 2011/0292246 A1* | 12/2011 | Brunner | 348/231.99 |
| 2013/0314548 A1* | 11/2013 | Guan et al. | 348/169 |

* cited by examiner

*Primary Examiner* — Atiba O Fitzpatrick
(74) *Attorney, Agent, or Firm* — Enterprise IP

(57) ABSTRACT

Disclosed herein is a method and system for performing normalization of an image using a cumulative histogram and a common color map for the R, G and B channels. On receiving an instruction from a user to normalize an image, the histogram for individual channels of the image is computed. The cumulative histogram from the histogram for individual channels is computed. The linear histogram cut off percentage is tripled. The min and max positions using the histogram stretch after the percentage cutoff is adjusted. The colormap is computed using the cumulative histogram and the linear histogram cut off percentage. The colormap is applied to the image data.

10 Claims, 8 Drawing Sheets
(2 of 8 Drawing Sheet(s) Filed in Color)

CONTRAST FOR RGB IMAGES IN A GIS APPLICATION

TECHNICAL FIELD

The embodiments herein relate to processing images in a Geographic Information Systems (GIS) application and, more particularly, to improving the quality of images in a GIS application by performing contrast stretching.

BACKGROUND

Contrast stretching (also known as histogram stretching) is an image processing algorithm used for normalization of images. During the process of normalization, the range of intensity values of the pixels in the images is changed. The normalization process scales the brightness values of the image, so that the darkest point in the image becomes black and the brightest point in the image becomes as bright as possible, wherein the hue of the image may not be changed. Normalization may be used to improve the contrast of images with poor contrast.

Currently, generic image processing programs and GIS application may be used for normalization of images. These algorithms may be used for greyscale images. Algorithms used by these programs and/or applications for normalization of multi-spectral images may be inefficient in terms of usage of resources of the device running the programs and/or applications, the algorithms may be computationally intensive. Also, some of the algorithms may result in color change of the pixels of the image, resulting in the image acquiring an artificial appearance.

In a first method, where RGB (Red, Green and Blue) in an image is translated into IHS (Intensity, Hue, and Saturation). Then, the contrast stretch of I channel is done to I'. Then, the I'HS is translated to R'G'B'. However, the translations from RGB to IHS to I'HS to RGB are very costly and the overall algorithm is slow.

In a second algorithm, the histogram stretch is applied on the R, G and B channels of the images separately. However, this may result in a change in the colour of the image and provides an artificial appearance to the image.

In another algorithm, the luminance channel from RGB is computed using

Luminance=$0.3R+0.59G+0.11B$.

The color map is computed using the luminance channel. The colour map is then applied on the R, G and B channels of the image. However, this may result in a change in the colour of the image and provides an artificial appearance to the image.

In another algorithm, the RGB in the image is translated to YUV. Then image enhancements are applied to Y to get Y'. Y'UV is translated to R'G'B'. However, the translations from RGB to YUV to Y'UV to R'G'B' are very costly and the overall algorithm is slow.

BRIEF DESCRIPTION OF THE FIGURES

The patent or application file contains at least one drawing executed in color. Copies of this patent or patent application publication with color drawing(s) will be provided by the Office upon request and payment of the necessary fee.

The embodiments herein will be better understood from the following detailed description with reference to the drawings, in which.

DETAILED DESCRIPTION OF EMBODIMENTS

Figure 1A:
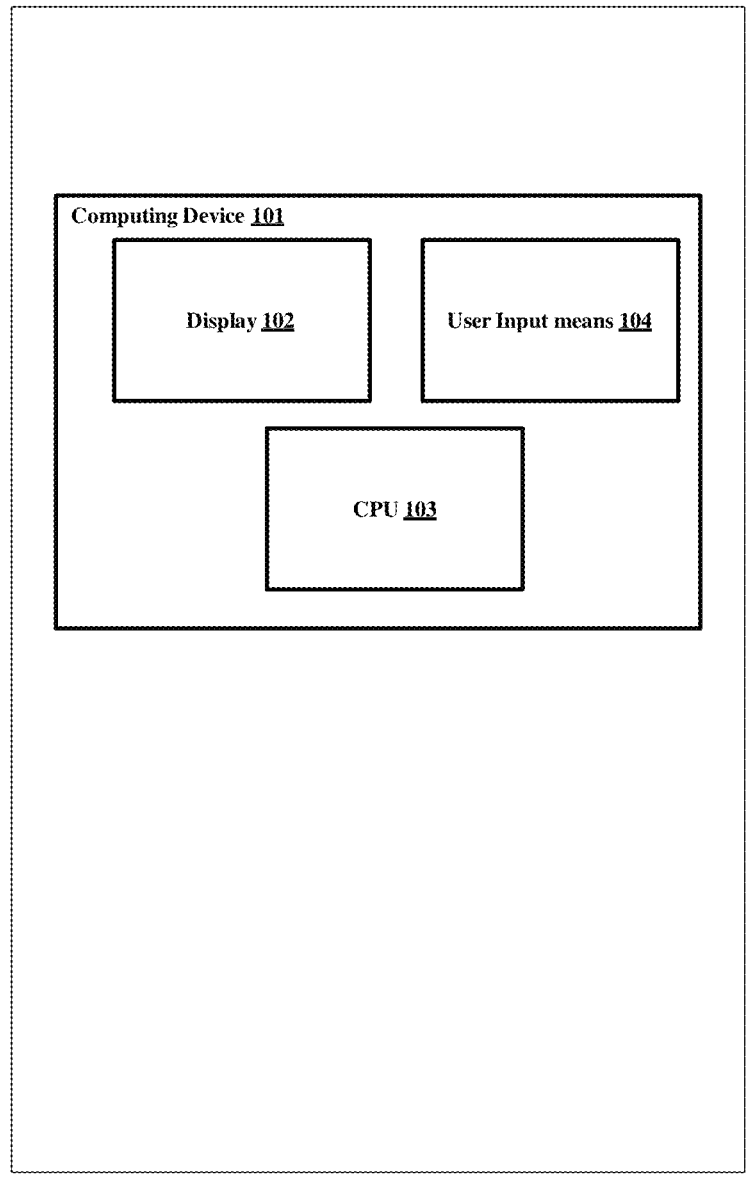
FIG. 1a illustrates a computing device comprising of a GIS application, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a method and system for performing normalization of an image by using a cumulative histogram and a common colour map for R, G and B channels. Referring now to the drawings, and more particularly to FIGS. 1 through 5, where similar reference characters denote corresponding features consistently throughout the figures, there are shown embodiments.

The terms 'normalization', 'contrast stretching' and 'histogram stretching' have been used interchangeably in the specification and these terms may be used to denote the process of normalization of an image.

FIG. 1a illustrates a computing device comprising of a GIS application, according to embodiments as disclosed herein. The computing device 101, as depicted, comprises of a display 102, a user input means 104 and a CPU (Central Processing Unit) 103. The computing device 101 may be at least one of a desktop computer, a laptop, a tablet, a smart phone, a mobile phone or any other device capable of accessing the GIS application. The display 102 may enable a user of the computing device 101 to view information. The display 102 may be a monitor, a separate display device connected to the other components of the computing device 101 using a cable/wire, an integrated display present in the body of the computing device 101 and so on. In an embodiment herein, the display 102 may comprise of more than one display devices. The user input means 104 may enable the user of the computing device 101 to interact with the computing device 101. The user input means 104 may comprise of at least one of a physical keyboard, a mouse, a touchpad, a joystick, an on-screen keyboard, a touchscreen and so on. The user may use more than one user input means 104 at a time to interact with the computing device 101. The CPU 103 comprises of a computing means enabling the computing device 101 to perform computing functions. The CPU 103 may be a separate device connected to the display 102 and the user input means 104 using a suitable means such as cable/wires and so on. The CPU 103 may be integrated with at least one of the display 102 and the user input means 104. The CPU 103 enables the user to access and operate the GIS application. The GIS application may be a browser based application (web application), which may be accessed by the user using a browser present on the computing device 101. The GIS application may be a stand-alone GUI (Graphical User Interface) based application, which the user may access directly using the computing device 101.

Figure 1B:
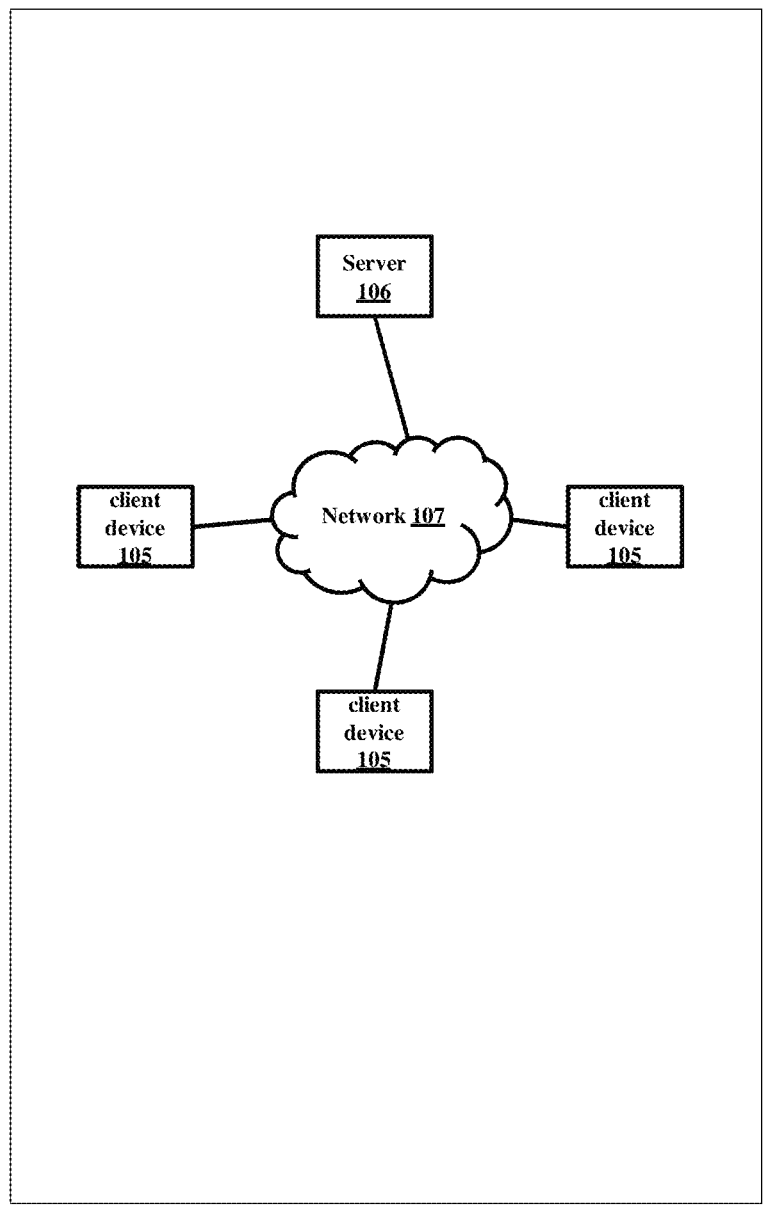
FIG. 1b illustrates a system comprising of plurality of clients connected to a server through a network, wherein the network enables the client to access the GIS application present on the server, according to embodiments as disclosed herein.

FIG. 1b illustrates a system comprising of plurality of clients connected to a server through a network, wherein the network enables the client to access the GIS application present on the server, according to embodiments as disclosed herein. The system comprises of a plurality of client devices 105 connected to at least one server 106 through a network 107. The client device 105 may be at least one of a desktop computer, a laptop, a tablet, a smart phone, a mobile phone or any other device capable of accessing the GIS application using the network 107. The network 107 may be at least one of the internet, a LAN (Local Area Network), a WAN (Wide Area Network) and so on, which may enable a plurality of client devices 105 to access the GIS application resident on the server 106. The GIS application may be a browser based application (web application), which may be accessed by the user from the server 106 using a browser present on the client device 105. The GIS application may be a stand-alone GUI (Graphical User Interface) based application, which the user may access directly using the client device 105.

Figure 1C:
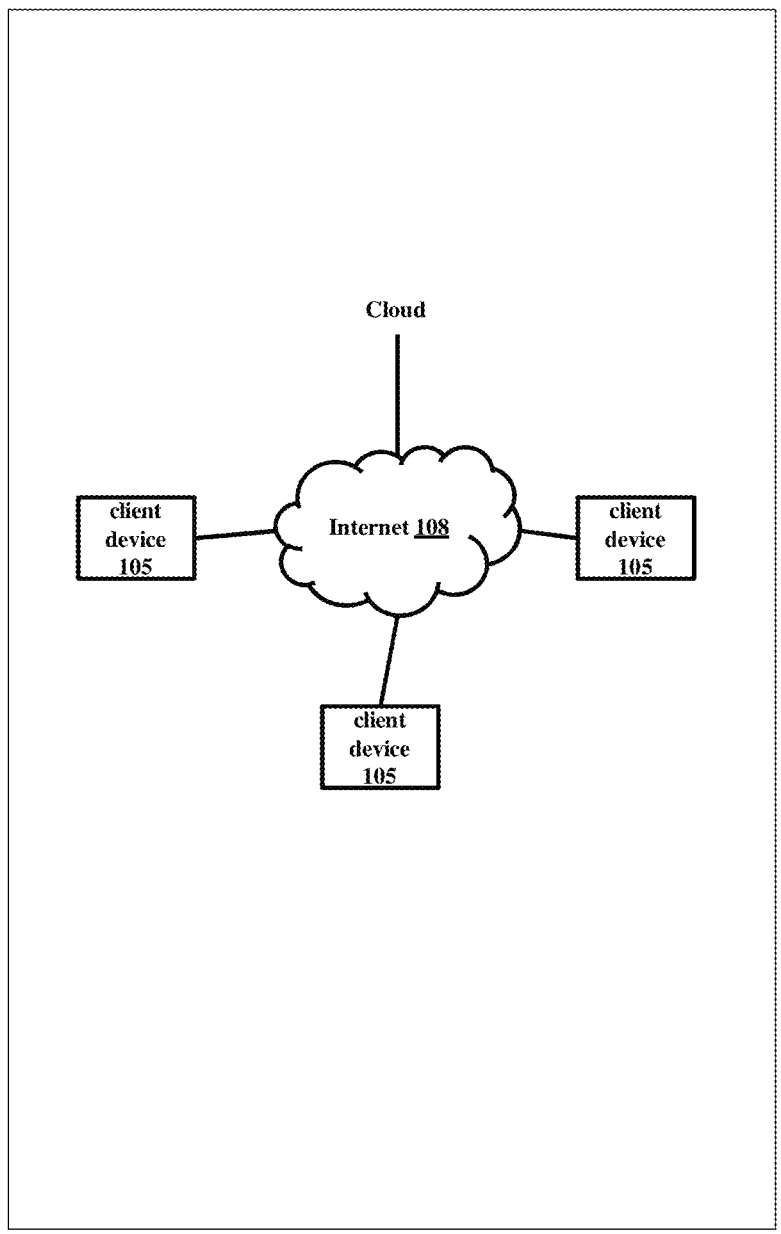
FIG. 1c illustrates a plurality of clients connected to the cloud, wherein the internet enables the client to access the GIS application present on the cloud, according to embodiments as disclosed herein.

FIG. 1c illustrates a plurality of clients connected to the cloud, wherein the internet enables the client to access the GIS application present on the cloud, according to embodiments as disclosed herein. FIG. 1c depicts a plurality of client devices 105 connected to the cloud through the internet 108. The client device 105 may be at least one of a desktop computer, a laptop, a tablet, a smart phone, a mobile phone or any other device capable of accessing the GIS application using the network 107. The client device 105 may access the GIS application through the cloud. The GIS application may be a browser based application (web application), which may be accessed by the user from cloud using a browser present on the client device 105. The GIS application may be a stand-alone GUI (Graphical User Interface) based application, which the user may access directly using the client device 105.

Figure 2:
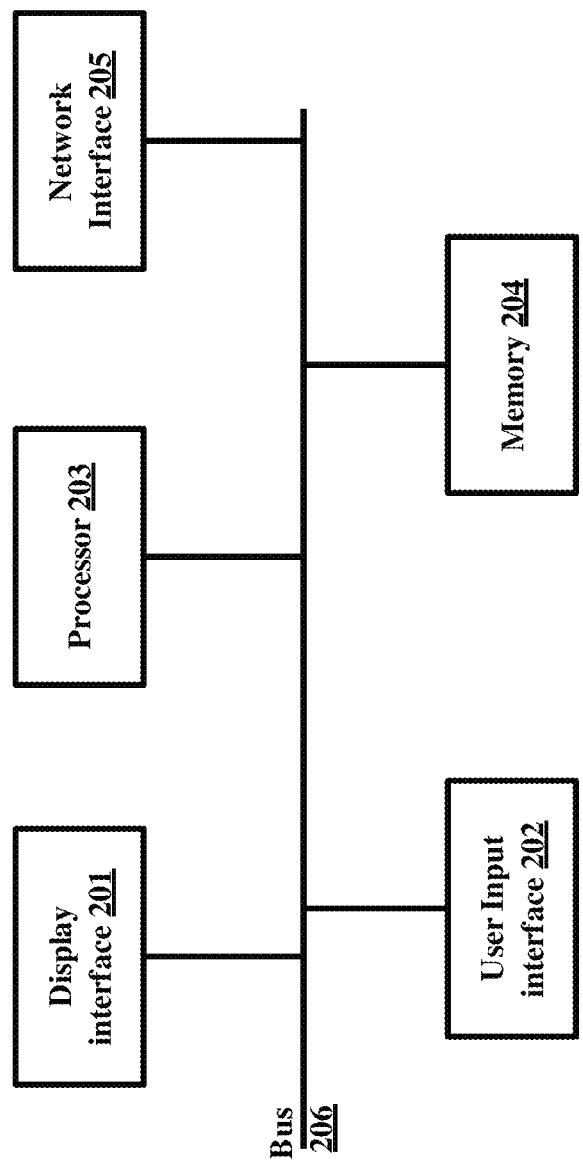
FIG. 2 depicts the computing device comprising of the GIS application, according to embodiments as disclosed herein.

FIG. 2 depicts the computing device comprising of the GIS application, according to embodiments as disclosed herein. The figure depicts a CPU 103 containing a display interface 201, a user input interface 202, a processor 203, a memory 204 and a network interface 205 and a bus 206. The display interface 201 enables the CPU 103 to communicate with the display 102. The display interface 201 may comprise of the drivers required for the CPU 103 to communicate with the display 102 and at least one physical port and/or connector which connects the CPU 103 to the display 102. In an embodiment herein, the display interface 201 may enable the CPU to communicate with a plurality of displays 102. The user input interface 202 enables the CPU 103 to communicate with the user input means 103. The user input interface 202 may comprise of the drivers required for the CPU 103 to communicate with the user input means 104 and at least one physical port and/or connector which connects the CPU 103 to the user input means 104. The processor 203 is configured to enable a plurality of applications resident on the CPU to be executed. Examples of the applications may be a browser, a standalone GUI based application and so on. The memory 204 may comprise of a volatile memory and a non-volatile memory. The memory 204 may be configured applications, data related to the applications and so on. The memory 204 may configured to make the applications and/or data available, on receiving a request from the processor 203. The network interface 204 may enable the CPU 103 to interface with at least one network. The network may be at least one of the internet, a LAN (Local Area Network), a WAN (Wide Area Network) and so on. The network interface 205 may comprise of the drivers required for the CPU 103 to communicate with the network and at least one physical port and/or connector which connects the CPU 103 to the network. The bus 206 connects the above mentioned components and enables the above mentioned components to communicate with each other.

The CPU 103, on receiving an instruction from a user to normalize an image, may compute the histogram for individual channels hR, hG, hB of the image. The CPU 103 may further compute the cumulative histogram h from hR, hG and hB using $$h[i]=hR[i]+hG[i]+hB[i]$$

Figure 3:
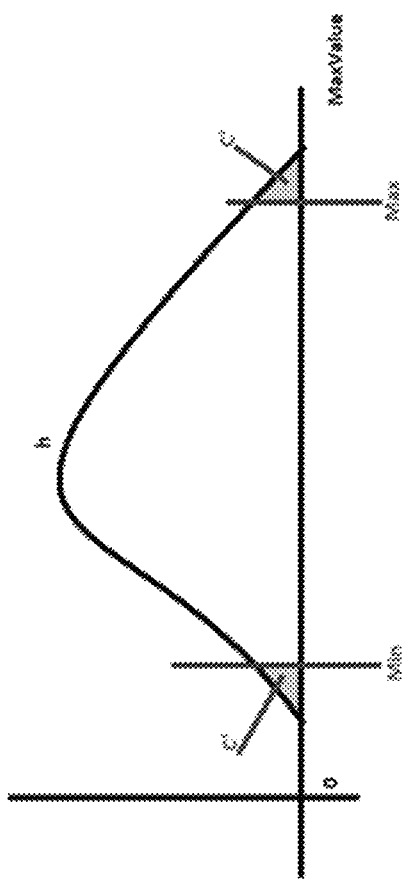
FIG. 3 depicts a cumulative histogram with the linear histogram cutoff percentage applied, according to embodiments as disclosed herein.

The CPU 103 may triple intended cut off percentage to obtain the linear histogram cut off percentage $$C'=3*C,$$

where C is the intended cut off percentage (wherein C may take a value between 0.5 to 0.6). The CPU 103 may triple the linear histogram cutoff percentage, as the cumulative histogram data is three folds more than the actual number of pixels. The CPU 103 may adjust the min and max positions of the cumulative histogram using the histogram stretch after the percentage cutoff. The CPU 103 may compute the colormap CM using cumulative histogram h and C' as follows (as depicted in FIG. 3)

CM[i]=0, if i<=Min
MaxValue, if i>=Max
(i−Min)/(Max−Min)*MaxValue, otherwise

The CPU 103 may further apply the colormap CM to the image data as follows
 for each pixel i,
 R'[i]=CM[R[i]]
 G'[i]=CM[G[i]]
 B'[i]=CM[B[i]]

Figure 4:
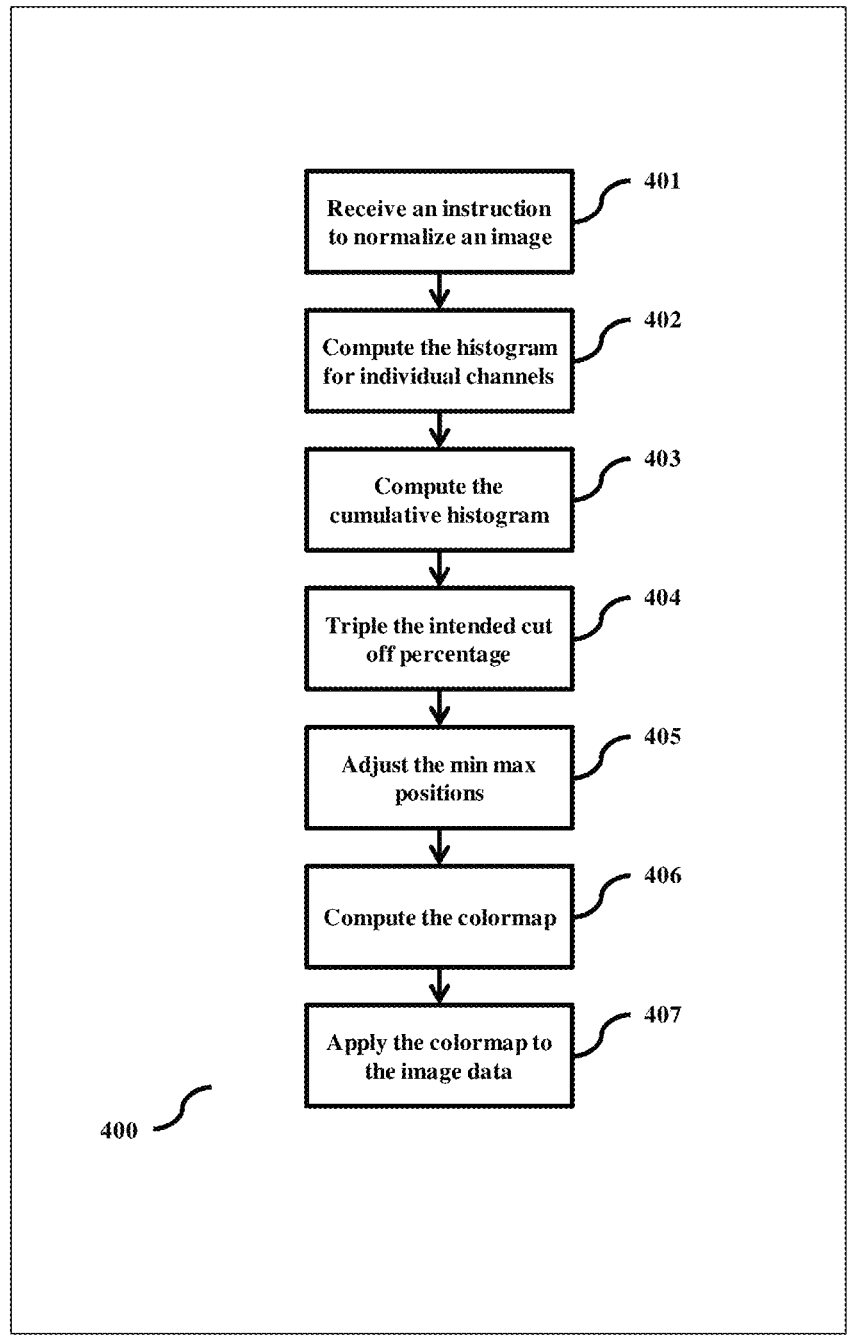
FIG. 4 is a flowchart illustrating the process for performing normalization of an image by using a cumulative histogram and a common colour map for R, G and B channels, according to embodiments as disclosed herein.
Figure 5A:
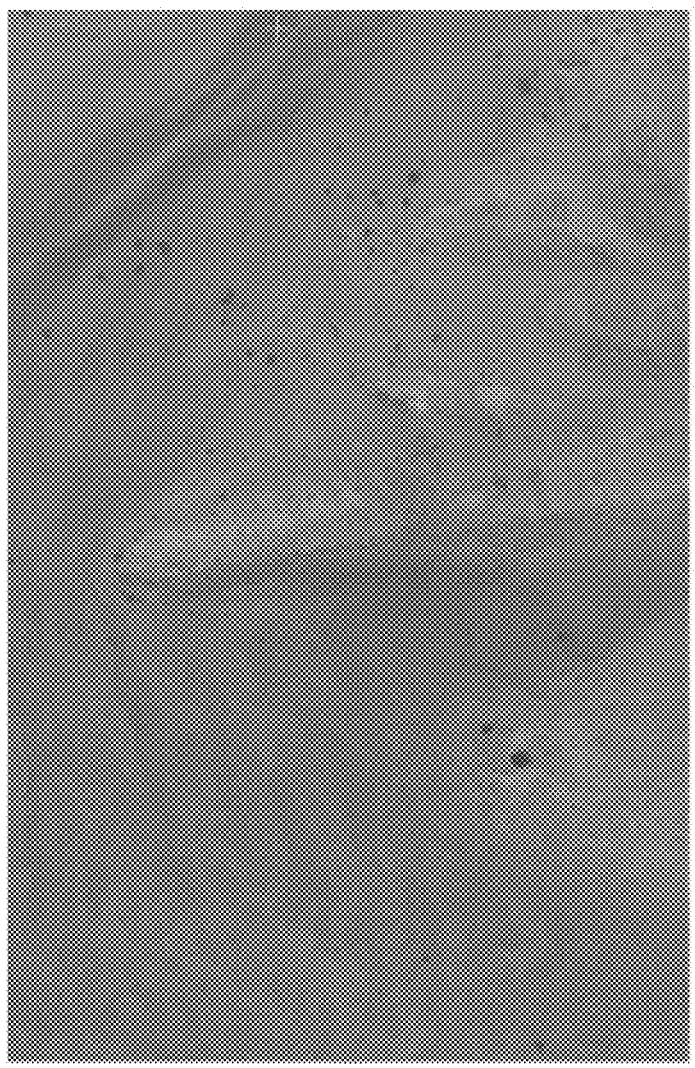
FIGS. 5a and 5b depict an image before normalization and after normalization, according to embodiments as disclosed herein.

FIG. 4 is a flowchart illustrating the process for performing normalization of an image by using a cumulative histogram and a common colour map for R, G and B channels, according to embodiments as disclosed herein. The CPU 103, on receiving (401) an instruction from a user to normalize an image (as depicted in FIG. 5a), computes (402) the histogram for individual channels hR, hG, hB of the image. The CPU 103 further computes (403) the cumulative histogram h from hR, hG and hB using $$h[i]=hR[i]+hG[i]+hB[i]$$

The CPU 103 triples (404) intended cut off percentage to obtain the linear histogram cut off percentage $$C'=3*C,$$

where C is the intended cut off percentage (wherein C may take a value between 0.5 to 0.6). The CPU 103 adjusts (405) the min max positions using the histogram stretch after the percentage cutoff. The CPU 103 computes (406) the colormap CM using cumulative histogram h and C' as follows (as depicted in FIG. 3)

CM[i]=0, if i<=Min
MaxValue, if i>=Max
(i−Min)/(Max−Min)*MaxValue, otherwise

Figure 5B:
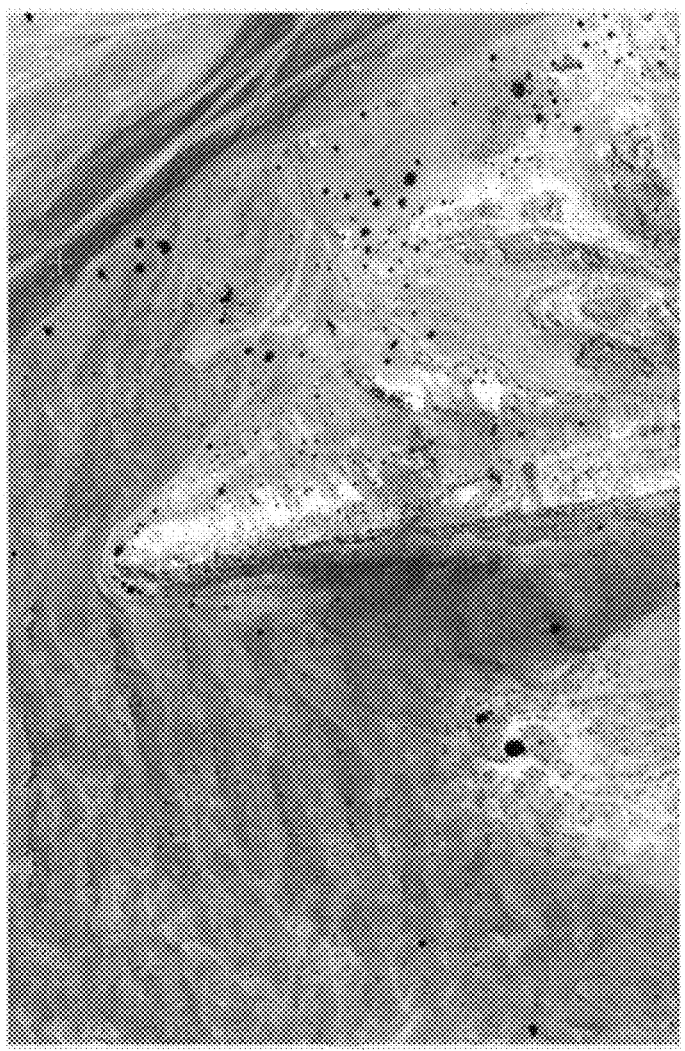

The CPU 103 further applies (407) the colormap CM to the image data as follows to obtain the normalized image (as depicted in FIG. 5b)

for each pixel i,
R'[i]=CM[R[i]]
G'[i]=CM[G[i]]
B'[i]=CM[B[i]]

The various actions in method 400 may be performed in the order presented, in a different order or simultaneously. Further, in some embodiments, some actions listed in FIG. 4 may be omitted.

Embodiments herein disclose an efficient contrast stretching (normalization) linear algorithm for RGB images, while retaining the true color of the image, and ensuring that the resulting image does not have any artificial appearance.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method for performing normalization of an image in a Geographic Information Systems (GIS) application, the method comprising:
   computing a histogram for each individual channel of the image;
   computing a cumulative histogram from the histogram for each individual channel;
   tripling an intended linear histogram cut off percentage to obtain a new value of linear histogram cut off percentage;
   computing a colormap by applying the new value of the linear histogram cut off percentage on the cumulative histogram; and
   applying the colormap to the image data to obtain the normalized image.

2. The method as claimed in claim 1, wherein the cumulative histogram is computed using:

$h[i]=hR[i]+hG[i]+hB[i]$ where h is the cumulative histogram and hR, hB and hG are histogram for R, G and B channels of the image.

3. The method as claimed in claim 1, wherein the method further comprises of calculating min and max positions of the cumulative histogram by applying the new value of the linear histogram cut off percentage, for computing the colormap.

4. The method as claimed in claim 3, wherein the colormap is computed using:

$CM[i]=0$, if $i<=$Min;

$CM[i]=$MaxValue, if $i>=$Max;

$CM[i]=((i-\text{Min})*\text{MaxValue})/(\text{Max}-\text{Min})$, otherwise wherein MaxValue is the maximum sample value;
   Min is the minimum sample value after applying cut off percentage; and
   Max is the maximum sample value after applying cut off percentage.

5. The method as claimed in claim 1, wherein applying the colormap to the image data as:
   for each pixel i,
   R'[i]=CM[R[i]]
   G'[i]=CM[G[i]]
   B'[i]=CM[B[i]].

6. A system for performing normalization of an image in a Geographic Information Systems (GIS) application, said system is configured for:
   computing a histogram for each individual channel of the image by a CPU;
   computing a cumulative histogram from the histogram for each individual channel by said CPU;
   tripling an intended linear histogram cut off percentage to obtain a new value of linear histogram cut off percentage by said CPU;
   computing a colormap by applying the new value of the linear histogram cut off percentage on the cumulative histogram by said CPU; and
   applying the colormap to the image data to obtain the normalized image by said CPU.

7. The system as claimed in claim 6, wherein the system is configured for computing the cumulative histogram using:

$h[i]=hR[i]+hG[i]+hB[i]$ where h is the cumulative histogram and hR, hB and hG are histogram for R, G and B channels of the image.

8. The system as claimed in claim 7, wherein the system is configured for calculating min and max positions of the cumulative histogram by applying the new value of the linear histogram cut off percentage, for computing the colormap.

9. The system as claimed in claim 6, wherein the system is configured for computing the colormap using:

$CM[i]=0$, if $i<=$Min;

$CM[i]=$MaxValue, if $i>=$Max;

$CM[i]=((i-\text{Min})*\text{MaxValue})/(\text{Max}-\text{Min})$, otherwise wherein MaxValue is the maximum sample value;
   Min is the minimum sample value after applying cut off percentage; and
   Max is the maximum sample value after applying cut off percentage.

10. The system as claimed in claim 6, wherein the system is configured for applying the colormap to the image data as:
    for each pixel i,
    R'[i]=CM[R[i]]
    G'[i]=CM[G[i]]
    B'[i]=CM[B[i]].

* * * * *